Aug. 15, 1939.    S. H. STOUGH    2,169,855
ARTICLE COLLECTION AND DELIVERY BOX
Filed Nov. 17, 1938    2 Sheets-Sheet 1
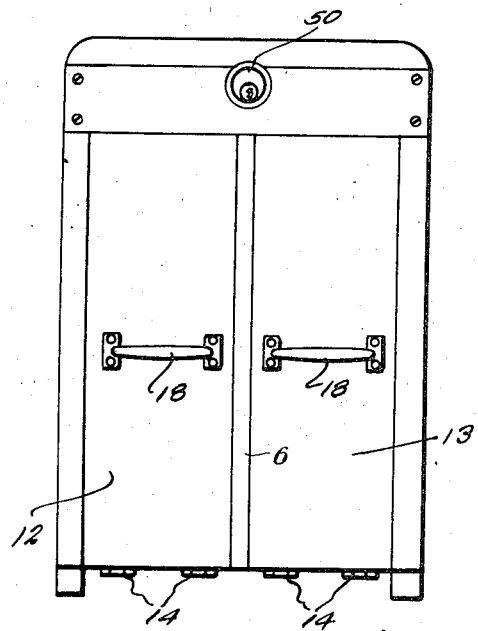
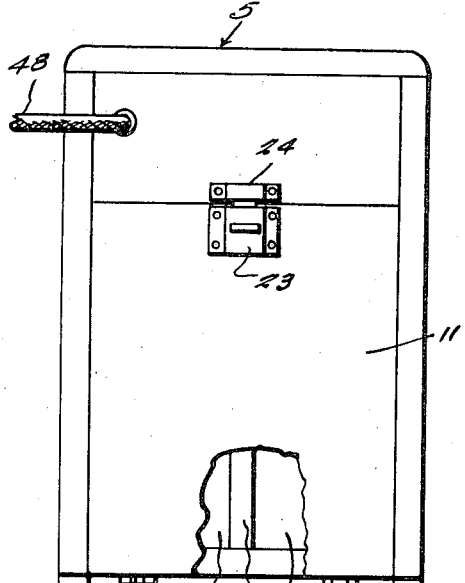
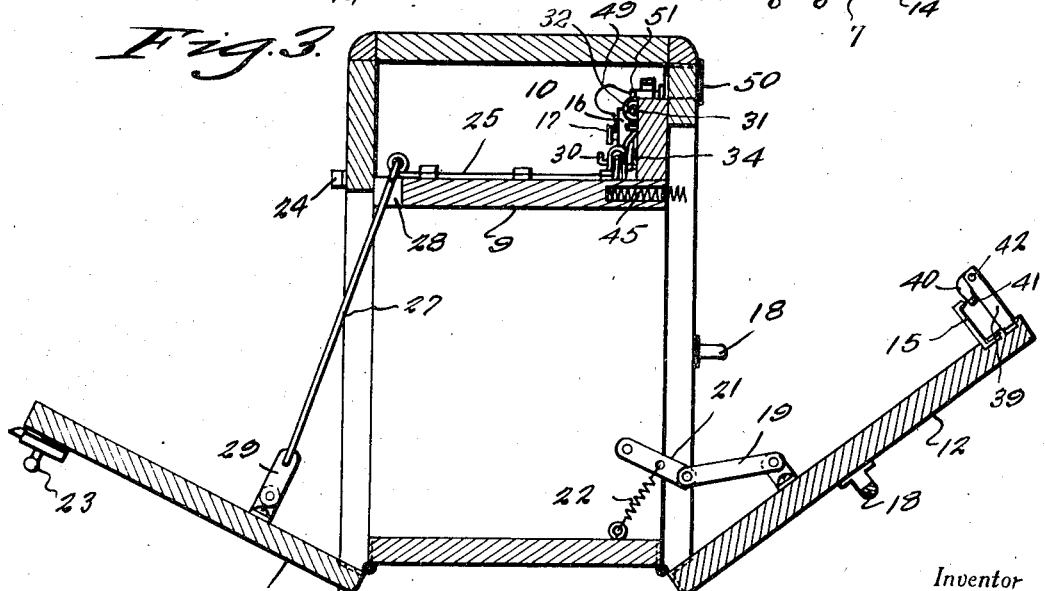
Inventor
Samuel H. Stough
By Clarence A. O'Brien
and Hyman Berman
Attorneys Aug. 15, 1939.   S. H. STOUGH   2,169,855
ARTICLE COLLECTION AND DELIVERY BOX
Filed Nov. 17, 1938   2 Sheets-Sheet 2
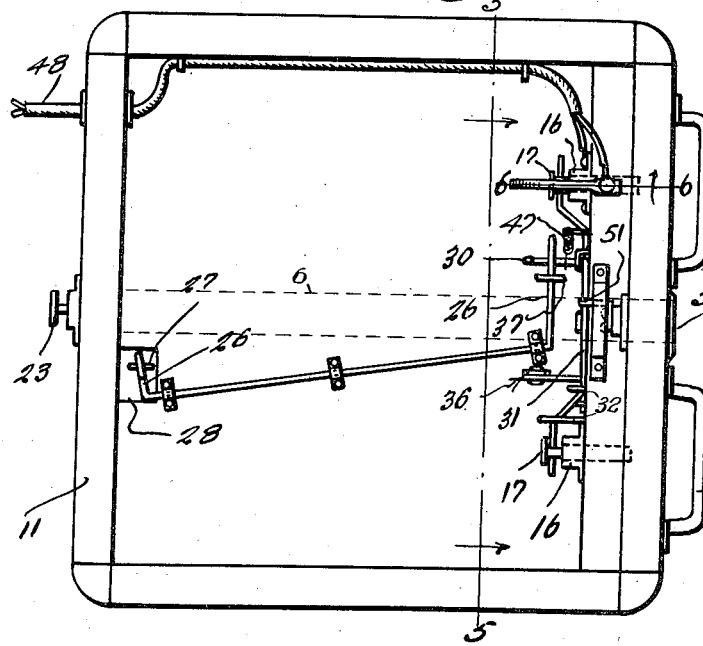
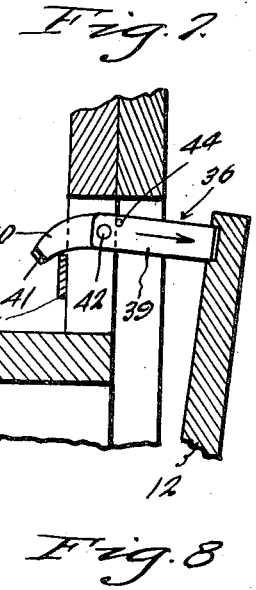
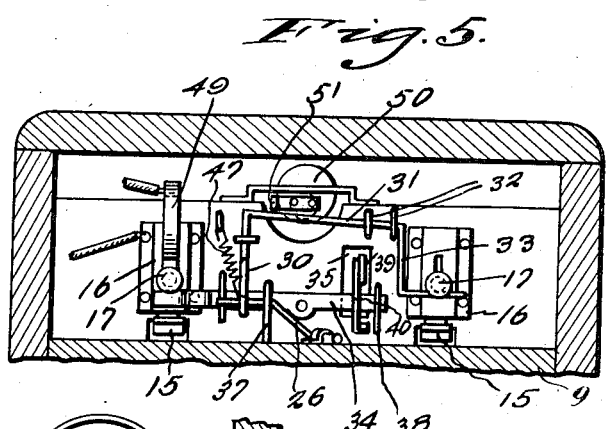
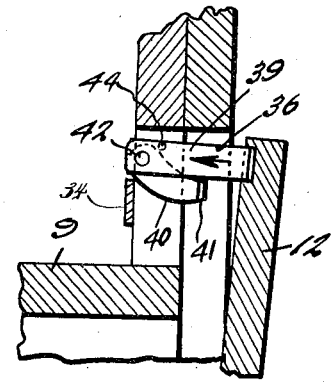
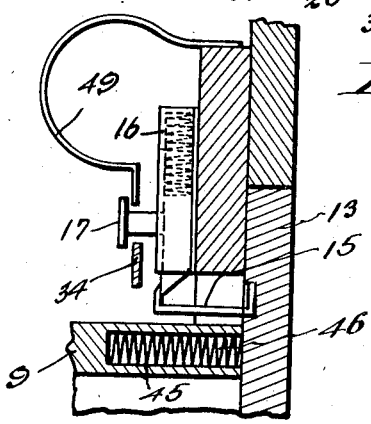
Inventor
Samuel H. Stough
By Clarence A. O'Brien
and Hyman Berman
Attorneys Patented Aug. 15, 1939

2,169,855

UNITED STATES PATENT OFFICE 2,169,855

ARTICLE COLLECTION AND DELIVERY BOX

Samuel H. Stough, St. Clair, Ala.

Application November 17, 1938, Serial No. 241,077

5 Claims. (Cl. 232—41.4)

This invention relates to article collection and delivery boxes especially adapted for domestic purposes wherein it is desired to make provision for receiving and keeping merchandise against theft after being delivered or from being interfered with by animals or the like.

The primary object of this invention is the provision of a device of the above stated character which is in the form of a double compartment casing easily entered by the owner to place in one compartment whatever container or article that is to be collected by the deliveryman on making a delivery and which compartment on being closed by the deliveryman after obtaining the article for collection, automatically opens the other compartment to receive the delivered article and which is adapted to be closed by the deliveryman and become automatically locked to prevent theft of the delivered article and may be obtained by the owner, through the operation of his door and which automatically again opens the article returning compartment for exposing whatever is to be returned or collected by the deliveryman on the next delivery.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a collection and delivery box constructed in accordance with my invention.

Figure 2 is a rear elevation, partly broken away, to show the double compartments within the casing.

Figure 3 is a transverse sectional view showing the owner's door in an open position and the door of the collection compartment in an open position having been automatically opened by the owner's door moving into an open position.

Figure 4 is a top plan view with the top wall of the casing removed to show the means of effecting the locking and releasing of the doors of the compartments.

Figure 5 is a sectional view taken on the line 5—5 of Figure 4.

Figure 6 is a detail sectional view taken on the line 6—6 of Figure 4.

Figure 7 is a fragmentary vertical sectional view showing a trip mechanism carried by the door of the collection compartment with the door moving toward an open position.

Figure 8 is a view similar to Figure 7 showing the trip mechanism effecting release of the door of the delivery compartment on the movement of the door of the collection compartment toward a closed position.

Figure 9 is a fragmentary side elevation illustrating the construction of the trip element.

Referring in detail to the drawings, the numeral 5 indicates a casing of any design desired and which is adapted to be mounted in a wall of a dwelling with the front side of said casing exposed on the exterior of the building while the rear side of the casing is exposed on the interior of the building. While it has been stated that the casing may be mounted in the wall of a dwelling, it may, of course, be located any other place desired by the owner such as being positioned on a porch or mounted on a post or similar device outside of the building.

The casing has therein a transversely arranged partition 6 dividing the casing into compartments 7 and 8. The casing is further provided with a horizontally disposed partition 9 for providing a chamber 10 in the upper portion of the casing above the compartments 7 and 8 and in which the mechanism for locking and releasing of the doors is located.

A rear hinged door 11 gives access to the compartments 7 and 8 while the front of the casing is equipped with doors 12 and 13 for giving access to the compartments 7 and 8, the doors 12 and 13 being hingedly mounted, as shown at 14, and are equipped with keepers 15 to be engaged by spring pressed latches 16 mounted in the chamber 10 and each including a spring pressed latch element equipped with a finger piece 17. The spring pressed latch elements engage with the keepers 15 for securing the doors 12 and 13 in closed position. The doors 12 and 13 on their outer faces are provided with suitable handles 18 to permit a deliveryman to readily move said doors into closed position.

Connected with the doors 12 and 13 are door checks 19 acting to limit the opening of said doors but which will permit the doors to open sufficiently to allow articles to be removed from the compartment 7 and articles to be placed in the compartment 8. Each door check 19 is in the form of pivotally connected links 21, one of which is pivotally connected to a door and the other to the partition 6 and has connected thereto a coil check spring 22. The spring 22 will permit the door to assume a partial open position when freed and when manual force is exerted on the door the spring will yield and permit further opening of the door.

The door 11 is equipped with a manually actuated catch 23 engageable with a keeper 24 on the rear wall of the casing for retaining the door 11 in a closed position.

Journaled on the partition 9 is a shaft 25 having its ends in the form of crank arms 26, one of which has pivotally connected thereto a connecting link 27 which extends through an opening 28 in the partition 9 and is pivotally connected to a bracket 29 on the door 11. The other crank arm 26 is engaged by a hook 30 formed on one end of a latch operating lever 31 which is journaled on the front wall of the casing within the chamber 10, as shown at 32. A portion of the lever 31 is in the form of a crank 33 engageable with the finger 17 of one of the latch elements 16 and the one employed for securing the door 12 in a closed position so that when the door 11 is swung into an open position, the door 12 will be automatically released to assume a partly open position for the purpose of exposing any article placed in the compartment 7 for collection by the deliveryman. It is understood the door 11 may be closed after placing an article in the compartment 7 and the door 12 remains open.

A latch operating lever 34 is pivotally mounted in the chamber 10 on the front wall and one end thereof engages with the finger piece 17 of the latch element 16 acting to secure the door 13 in a closed position. A portion of the latch operating lever 34 extends across a slot 35 formed in the front wall of the casing and through which operates a trip element 36 carried by the door 12. The pivotal movement of the latch operating lever 34 is guided by guides 37 and 38.

The trip element 36 consists of a rigid member 39 fixed on the door 12 and a pivoted member 40 having a slight arcuate curvature thereto with its free end disposed angularly, as shown at 41. The opposite end of the member 40 is pivoted onto the member 39, as shown at 42, and has a shoulder 43 to engage with a stop pin 44 on the member 39 for limiting the pivotal movement of the member 40 in one direction.

When the door 12 is in a closed position, the rigid member 39 overlies the latch operating bar 34 by entering the chamber 10 by way of the slot 35 and which positions the pivoted member 40 within the chamber 10 past the latch operating bar 34. The door 12 being released by the opening of the door 11 and moving toward an open position draws the trip element 36 outwardly of the chamber 10 and the pivoted member 40 swings downwardly until the angularly related end 41 engages the fixed member 39, as clearly shown in Figure 3. The deliveryman on obtaining from the compartment 7 the article to be collected closes the door 12 and on said door 12 closing the trip element with the member 40 thereof positioned as shown in Figure 8 enters the chamber 10, the pivoted member 40 camming the latch operating bar 34 so as to operate the latch for the releasing of the door 13. As soon as the door 13 is freed it gravitates to an open position so that the deliveryman may place the article to be delivered into the compartment 8.

The owner when desiring to obtain the delivered article opens the door 11 which automatically releases the door 12 to assume an open position. The article delivered in the compartment 8 may be then easily obtained by the owner.

It is to be understood that when the deliveryman, after placing the article of delivery into the compartment 8, closes the door 13 which automatically locks on arriving in a closed position and remains locked until the door 12 is again moved into a closed position.

As the member 40 of the trip element cams the latch operating lever 34 to release the door 13 it passes said latch operating lever 34 to assume its initial position so that the door 12 can again open without effecting operation of the latch operating lever 34.

The purpose of the shoulder 43 and the stop pin 44 is to prevent the pivoted element 40 from swinging over onto the fixed element 39 as the door 12 moves into an open position, but which will permit sufficient pivotal movement of the element 40 that it may ride over the latch operating member 34 without effecting movement thereto during the movement of the door 12 toward an open position.

Seated in a socket 45 of the partition 9 is a coil spring 46 to be compressed by the door 12 moving into a closed position so that when said door 12 is released by the opening of the door 11 the spring acts to start the door 12 on its movement toward an open position.

A coil spring 47 is connected with the crank arm 26 of the shaft 25 which engages with the latch operating lever 31 to remove play from these parts.

An electric alarm circuit (not shown) and including the conductors 48 enter the chamber 10 through an opening provided in the rear wall and one of the conductors is connected to a contact 49 and the other conductor is connected to the latch element of the door 13 so that when the finger piece 17 of said latter-named latch element enters the chamber 10 on the closing of the door 13 it will engage with the contact 49 and complete the electric circuit, thereby sound an alarm to warn the owner that an article has been delivered into the compartment 8.

When the device is employed separate from a building, that is not built in the wall of the building or dwelling, the rear wall of the casing is preferably made solid and in order to bring about operation of the doors 12 and 13 a key operated lock mechanism 50 is provided in the front wall of the casing and the key barrel thereof has connected thereto an extension 51 which is adapted to engage with the latch operating member 31 when a key is inserted in the lock mechanism 50 and the barrel turned so as to release the door 12 to assume an open position to permit the deliveryman to obtain the article of collection arranged in the compartment 7. The deliveryman on obtaining said article closes the door 12 which automatically releases the door 13 so that the deliveryman may place the article of delivery in the compartment 8 and then close the door 13, thereby preventing theft of the article delivered. The owner in order to obtain the article from the compartment 8 must employ the key in the key mechanism 50 to release the door 12 and then manually close the door 12 to release the door 13 in order that the article may be removed from the compartment 8.

It is believed that the foregoing description, when taken in connection with the accompanying drawings, will fully set forth the construction and advantages of this invention to those skilled in the art to which such a device relates, so that further detailed description is not required.

Having thus described my invention, what I claim is:

1. An article collection and delivery device comprising a casing having separate compartments, hinged front doors for opening and closing said compartments, a rear hinged door on said casing giving access to both compartments, latches arranged in said casing for securing the front doors closed, means operated by the opening of the rear door to actuate the latch of one of said front doors to permit an article positioned in one of the compartments to be removed, and means automatically operating the latch of the other door by the closing of the door of said latter-named compartment so that an article to be delivered may be positioned in the other compartment and the front door thereof adapted to be manually closed to prevent theft of the latter-named article.

2. An article collection and delivery device comprising a casing having separate compartments, hinged front doors for opening and closing said compartments, a hinged rear door on said casing to give access to both compartments, latches arranged in the casing for securing the front doors closed, a shaft journaled in said casing, means connecting said shaft to the rear door for the operation thereof by the opening of the rear door, a latch operating means operated by said shaft for actuating the latch of one of the front doors to permit an article positioned in one of the compartments to be removed, and means automatically operating the latch of the other front door by closing the front door of said latter-named compartment so that an article to be delivered may be positioned in the other compartment and the front door thereof adapted to be manually closed to prevent theft of the latter-named article.

3. An article collection and delivery device comprising a casing having separate compartments, hinged first and second front doors for opening and closing said compartments and adapted to open by gravity, a hinged rear door on said casing to give access to both compartments, latches arranged in the casing for securing the front doors closed, a shaft journaled in said casing, means connecting said shaft to the rear door for the operation thereof by the opening of the rear door, a latch operating means operated by said shaft for actuating the latch of the first front door to permit an article positioned in one of the compartments to be removed, a pivotally mounted latch operating means for effecting operation of the latch of the second door, and a trip mechanism carried by the first door for effecting the second-named latch operating means by the closing of the first door for releasing the second door of the other compartment to permit an article to be delivered therein and the front door thereof adapted to be manually closed and latched to prevent theft of the latter-named article.

4. An article collection and delivery device comprising a casing having separate compartments, hinged first and second front doors for opening and closing said compartments and adapted to open by gravity, a hinged rear door on said casing to give access to both compartments, latches arranged in the casing for securing the front doors closed, a shaft journaled in said casing, means connecting said shaft to the rear door for the operation thereof by the opening of the rear door, a latch operating means operated by said shaft for actuating the latch of the first front door to permit an article positioned in one of the compartments to be removed, a pivotally mounted latch operating means for effecting operation of the latch of the second door, and a trip element carried by the first door for effecting operation of the second-named latch operating member to free the second door to permit an article for delivery to be placed in the other compartment and the front door thereof adapted to be manually closed to prevent theft of the latter-named article.

5. An article collection and delivery device comprising a casing having separate compartments, hinged first and second front doors for opening and closing said compartments and adapted to open by gravity, a hinged rear door on said casing to give access to both compartments, latches arranged in the casing for securing the front doors closed, a shaft journaled in said casing, means connecting said shaft to the rear door for the operation thereof by the opening of the rear door, a latch operating means operated by said shaft for actuating the latch of the first front door to permit an article positioned in one of the compartments to be removed, a pivotally mounted latch operating means for effecting operation of the latch of the second door, a trip element carried by the first door for effecting operation of the second-named latch operating means to free the second door to permit an article for delivery to be placed in the other compartment and the front door thereof adapted to be manually closed to prevent theft of the latter-named article, said trip mechanism including a rigid member and an arcuate curved pivoted member having an angularly related end, said pivoted member adapted to slide freely over the second-named latch operating means on the movement of the first door into an open position and adapted to cam said second-named operating means on the first door moving into a closed position or freeing the second door.

SAMUEL H. STOUGH.